(12) United States Patent
Barron et al.

(10) Patent No.: US 6,928,409 B2
(45) Date of Patent: Aug. 9, 2005

(54) SPEECH RECOGNITION USING POLYNOMIAL EXPANSION AND HIDDEN MARKOV MODELS

(75) Inventors: David L. Barron, Scottsdale, AZ (US); William Chunhung Yip, Phoenix, AZ (US)

(73) Assignee: Freescale Semiconductor, Inc., Austin, TX (US)

(*) Notice: Subject to any disclaimer, the term of this patent is extended or adjusted under 35 U.S.C. 154(b) by 562 days.

(21) Appl. No.: 09/871,063

(22) Filed: May 31, 2001

(65) Prior Publication Data

US 2002/0184025 A1 Dec. 5, 2002

(51) Int. Cl.[7] ............................................. G10L 15/14
(52) U.S. Cl. ................... 704/256; 704/243; 704/242; 704/254; 704/231
(58) Field of Search ............................. 704/256, 242, 704/243, 231, 254, 232, 200; 706/20

(56) References Cited

U.S. PATENT DOCUMENTS

| | | | | |
|---|---|---|---|---|
| 5,289,562 A | * | 2/1994 | Mizuta et al. | 704/200 |
| 5,615,299 A | * | 3/1997 | Bahl et al. | 704/254 |
| 5,884,261 A | * | 3/1999 | de Souza et al. | 704/255 |
| 5,937,384 A | * | 8/1999 | Huang et al. | 704/256 |
| 5,946,653 A | * | 8/1999 | Campbell et al. | 704/243 |
| 5,963,903 A | * | 10/1999 | Hon et al. | 704/254 |
| 6,006,175 A | * | 12/1999 | Holzrichter | 704/208 |
| 6,038,535 A | * | 3/2000 | Campbell | 704/231 |
| 6,112,175 A | * | 8/2000 | Chengalvarayan | 704/256 |
| 6,131,089 A | * | 10/2000 | Campbell et al. | 704/232 |
| 6,243,695 B1 | * | 6/2001 | Assaleh et al. | 706/20 |

* cited by examiner

*Primary Examiner*—Vijay B. Chawan
(74) *Attorney, Agent, or Firm*—Joanna G. Chiu

(57) ABSTRACT

A speech recognition system (10) having a sampler block (12) and a feature extractor block (14) for extracting time domain and spectral domain parameters from a spoken input speech into a feature vector. A polynomial expansion block (16) generates polynomial coefficients from the feature vector. A correlator block (20), a sequence vector block (22), an HMM table (24) and a Viterbi block (26) perform the actual speech recognition based on the speech units stored in a speech unit table (18) and the HMM word models stored in the HMM table (24). The HMM word model that produces the highest probability is determined to be the word that was spoken.

4 Claims, 3 Drawing Sheets

SPEECH RECOGNITION USING POLYNOMIAL EXPANSION AND HIDDEN MARKOV MODELS

BACKGROUND OF THE INVENTION

The present invention relates in general to electronic communication devices and, more particularly, to electronic communication devices incorporating speech recognition algorithms.

Markov models, Dynamic Time Warping (DTW) and neural-net microprocessors have been applied to machine recognition of speech. Markov models are based on a mathematical structure that forms the theoretical basis for a wide range of applications. When Markov models are applied to speech recognition, the models are referred to as the Hidden Markov Models (HMM) to include the case where the observation is a probabilistic function of the state. A state transition matrix based on specific observations provides a probability density distribution matrix. Thus, the Hidden Markov Models used in speech recognition are characterized by a process that provides evaluation of the probability or likelihood of a sequence of speech sounds.

Typically, a speech recognition system using HMM includes a feature analysis block that provides observation vectors used for training the HMMs that characterize various speech sounds. A unit-matching block provides the likelihood of a match of all sequences of speech recognition units to an unknown input speech sound. A lexical decoding block places constraints on the unit-matching block so that the paths investigated are those corresponding to sequences of speech sounds that are in a word dictionary. Syntactic and semantic analysis blocks further constrain the paths investigated to provide higher performance of the speech recognition system.

Speech recognition is becoming more prevalent, but new techniques are needed to make applications more reliable. The demand for higher speech recognition accuracy is relentless, requiring continuous improvements in the performance of speech recognition algorithms. Accordingly, it would be advantageous to have a method for developing a set of speech building blocks that improve a speech recognition system.

DETAILED DESCRIPTION OF THE PREFERRED EMBODIMENT

In general, the present invention describes a process for combining sections of two methods of speech recognition for the purpose of improved recognition accuracy. Frequently, patterns are not directly observable, but are indirectly, and probabilistically observable as another set of patterns, i.e., a hidden Markov model. These hidden Markov models (HMM) have proved to be of great value in many current areas of research, notably speech recognition. In accordance with the present invention, the speech recognition system incorporates a polynomial expansion algorithm at the front end and a Hidden Markov Model (HMM) as the final process of the recognition system.

The high order polynomial vectors generated in the front end are used in a Hidden Markov Model (HMM) where a statistical analysis is performed on the data. The polynomial expansion algorithm is also used to initialize a speech unit table that stores the building blocks of speech. The use of Vector Quantization on the polynomial expanded feature vectors of small segments of speech maximizes the cluster separation in vector space and provides improved speech building blocks. Thus, the present invention provides a set of speech building blocks that increase the recognition error distance and improve the classifiers performance. The present invention maintains a memory storage advantage of a phoneme recognition system.

Figure 1:
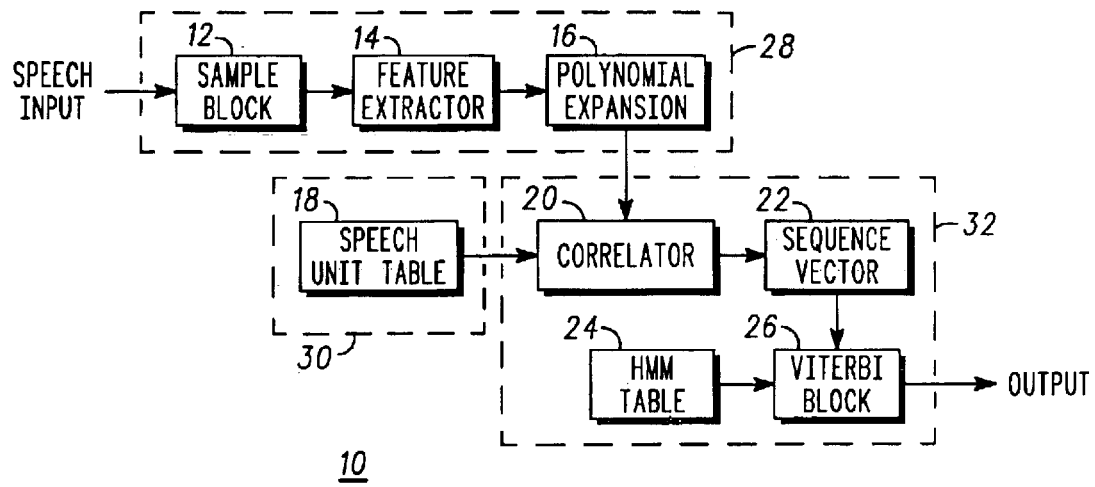
FIG. 1 is a block diagram for a speech recognition system in accordance with the present invention.

FIG. 1 is a block diagram for a speech recognition system 10 in accordance with the present invention. Speech recognition system 10 consists of three basic sections. The first section is an extraction section 28 having an input for receiving an input speech, a sequence of speech sounds, or a signal into a speech sampler block 12. The input speech is selected from a large uniform database of speech with a wide range of words, speakers and accents. The output data of sampler block 12 is transferred to a feature extractor block 14 that extracts time domain and spectral domain parameters from the spoken input speech into a feature vector. The feature vectors typically consist of cepstral, delta cepstral, linear prediction coefficients, energy and magnitudes, etc. The feature vectors from feature extractor block 14 are expanded by a polynomial expansion block 16 into high order polynomials, typically a $4^{th}$ order polynomial.

The second section is a building block section 30 having a speech unit table 18 that creates a set of speech building blocks that are used to construct any word in a spoken language. Speech unit table 18 is described in the block diagram shown in FIG. 2. The third section is an HMM section 32 that performs a Hidden Markov Model statistical analysis of the feature vector sequence that is used to select the spoken word. HMM section 32 includes a correlator block 20 that correlates each vector in the current word derived from the speech input received by sampler block 12 with every speech segment vector stored in speech unit table 18. Thus, correlator block 20 compares the expanded $4^{th}$ order polynomials from polynomial expansion block 16 against the $4^{th}$ order polynomial representation speech segments received from speech unit table 18. A best match is determined for each input speech and the results of the comparison are passed to a sequence vector block 22. Although $4^{th}$ order polynomials are compared by correlator block 20, it should be understood that different order polynomials could be compared.

For a particular HMM, the Viterbi algorithm is used to find the most probable sequence of hidden states given a sequence of observed states. A Viterbi block 26 receives inputs from sequence vector 22 and HMM table 24. HMM table 24 consists of three matrices for each word in the vocabulary, i.e. Initial State, State Transition, and Observation Probability Density Distribution. The Initial State matrix is a list of probabilities for starting in each of the possible states. The State Transition matrix lists the probabilities of transitioning from any given state to all possible states. The Observation Probability Density Distribution matrix lists the probabilities of any given speech unit being observed from any given state. Viterbi block 26 provides an output that represents the single best state sequence or path to maximize the probability of having reached the desired state.

Figure 2:
FIG. 2 is a block diagram for a speech unit table shown in FIG. 1.

FIG. 2 is a block diagram for speech unit table 18 shown in FIG. 1. A feature vector generation block 40 algorithmically generates the speech building blocks from a large training set of input speech that consists of several speakers repeating the recognizer's vocabulary words. The entire database is sampled and feature vectors are extracted for each frame of input speech. The features that are extracted are typically cepstral and/or delta cepstral coefficients, LPC coefficients, energy, etc.

The feature vectors are transferred to a polynomial expansion block 42 and expanded to a $4^{th}$ order polynomial via cross multiplication and averaged over N frames, where N represents the size of the desired speech building block. A typical size for N is around 100 milliseconds (ms). It should be noted that feature vector generation block 40 has a function that is similar to the function of feature extractor block 14 shown in FIG. 1. Further, polynomial expansion block 42 has a function similar to that of polynomial expansion block 16 shown in FIG. 1. It should be further noted that feature vector generation block 40 and polynomial expansion block 42 of speech unit table 18 generate data values and coefficients during a training mode. Following the training mode, feature extractor block 14 and polynomial expansion block 16 generate data values and coefficients when a speech input is received by speech recognition system 10.

Still referring to FIG. 2, the polynomial coefficients from polynomial expansion block 42 are passed to a Vector Quantizer (VQ) block 44. The polynomial coefficients are a very large database for $4^{th}$ order polynomial vectors, with each vector representing a small segment of speech. Speech in general consists of a relatively small number of unique sounds that are concatenated together to build the more complex words in a language. Vector Quantizer block 44 reduces or quantizes the large number of speech segments into a predefined smaller number of speech segments or building blocks. Therefore, given a large sampling of input speech data, it follows that there will be a high degree of redundancy in the resulting feature vectors. This redundancy is seen as clustering around specific points or vectors in the feature vector data space. The purpose of Vector Quantizer block 44 is to find the centroids of the clusters in the feature vector data space. The more accurately Vector Quantizer block 44 determines these centroids the less error is associated with the quantization process.

After the data has passed through Vector Quantizer block 44, a finite set of $4^{th}$ order vectors represent the desired recognizer's vocabulary. A processing block 46 generates the final building block by solving for each speech building block's $2^{nd}$ order vector. This is done by combining the sum of all $4^{th}$ order vectors with a scaled version of each individual vector and mapping the result into a square matrix. The square matrix is then decomposed (using a Cholesky decomposition) into an upper and a lower triangular matrix and solved by back substitution. The process of combining all vectors, mapping into a square matrix and solving for the individual vector helps to maximize the vector space separation of the resulting speech building blocks.

In operation, during the training process for the speech recognizer 10, the speech unit sequence that makes up the current word is used to train the Hidden Markov Model (HMM) for that word. First the Viterbi algorithm is used to determine the most probable state sequence for the model, given the speech unit sequence for the current word and given the word model to be trained. The Viterbi algorithm performs a maximum likelihood computation by calculating a measure of similarity, or distance, for all possible paths or sequences. The state sequence is then used to update the state transition matrix and the observation probability density distribution matrix for the current HMM word model. The most probable state sequence is then recalculated based on the updated model, and then the model is updated again using the results of the recalculated state sequence. This update cycle is repeated until the model converges.

Figure 3:
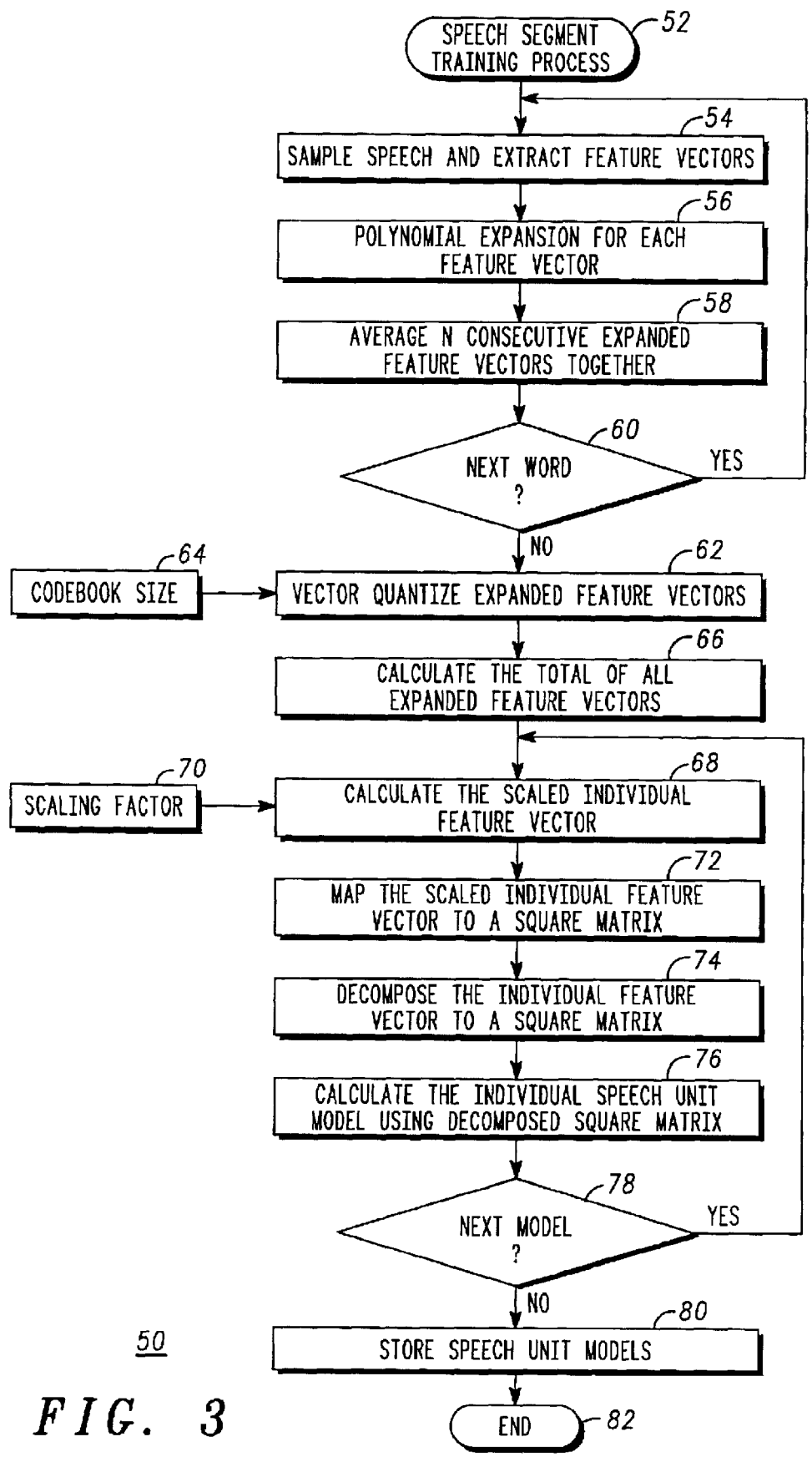
FIG. 3 is a flowchart for generating the speech building blocks in the speech unit table shown in FIGS. 1 and 2.

FIG. 3 is a flowchart 50 of the process that generates the speech building blocks in the speech unit table 18 shown in FIGS. 1 and 2. Process steps 54, 56 and 58 are associated with feature vector generation block 40 and polynomial expansion block 42 shown in FIG. 2. During a speech segment training process 52 a large training set of input speech is received. Note that even though feature vector generation block 40 is shown in FIG. 2 without an input for receiving input speech, that block in fact does receive input speech in the training mode. Thus, it should be noted that vector generation block 40 is described in the figures having HMM models defined after the training process.

Prior to the training mode, each word is sampled and feature vectors are extracted for that word in process step 54. A high order polynomial expansion is generated for each feature vector in process step 56. N consecutive expanded feature vectors are averaged together in process step 58. Thus, a predefined set of speech parameters are extracted from the sampled speech every frame. The speech parameters or features that are extracted are typically cepstral and/or delta cepstral coefficients, LPC coefficients, energy, etc. Next word 60 provides for another word to be spoken by the same, or another, speaker that is repeating the recognizer's vocabulary words.

The third section of speech recognition system 10 performs the actual speech recognition based on the speech units and the HMM word models created in the steps shown by flowchart 50 of FIG. 3. The recognizer's feature vector extraction and word sequence building is very similar to the feature vector extraction and word sequence building of the training process described above. For the given word sequence, the forward probability is calculated for each HMM word model in the vocabulary. The forward probability calculation uses the word sequence, the state transition matrix and the observation probability density distribution matrix to calculate the probabilities. The HMM word model that produces the highest probability is determined to be the word that was spoken.

After the sample speech features are extracted, expanded and averaged, the resultant polynomial vectors are vector quantized during step 62 to provide a set of 4th order vectors that represent the desired number of speech building blocks for the target language and vocabulary of the recognizer. Vector quantization step 62 is described above with reference to vector quantizer 44 in FIG. 2. The number of such vectors is defined by codebook size 64. After vector quantization step 62, a finite set of 4th order vectors represent the desired recognizer's vocabulary. The sum of the 4th order feature vectors is calculated during step 66. The individual feature vector of the current speech building block is scaled using the summation vector from step 66 and a scaling factor 70. The resulting scaled vector is then mapped into a square matrix during step 72. The square matrix is then decomposed (using a Cholesky decomposition) into an upper and a lower triangular matrix during step 74, and solved by back substitution during step 76. Steps 68 through 76 are repeated via next model step 78 until all speech building blocks have been processed and a model has been created for each. The resulting speech unit models are stored during step 80, and the process completes at step 82.

Figure 4:
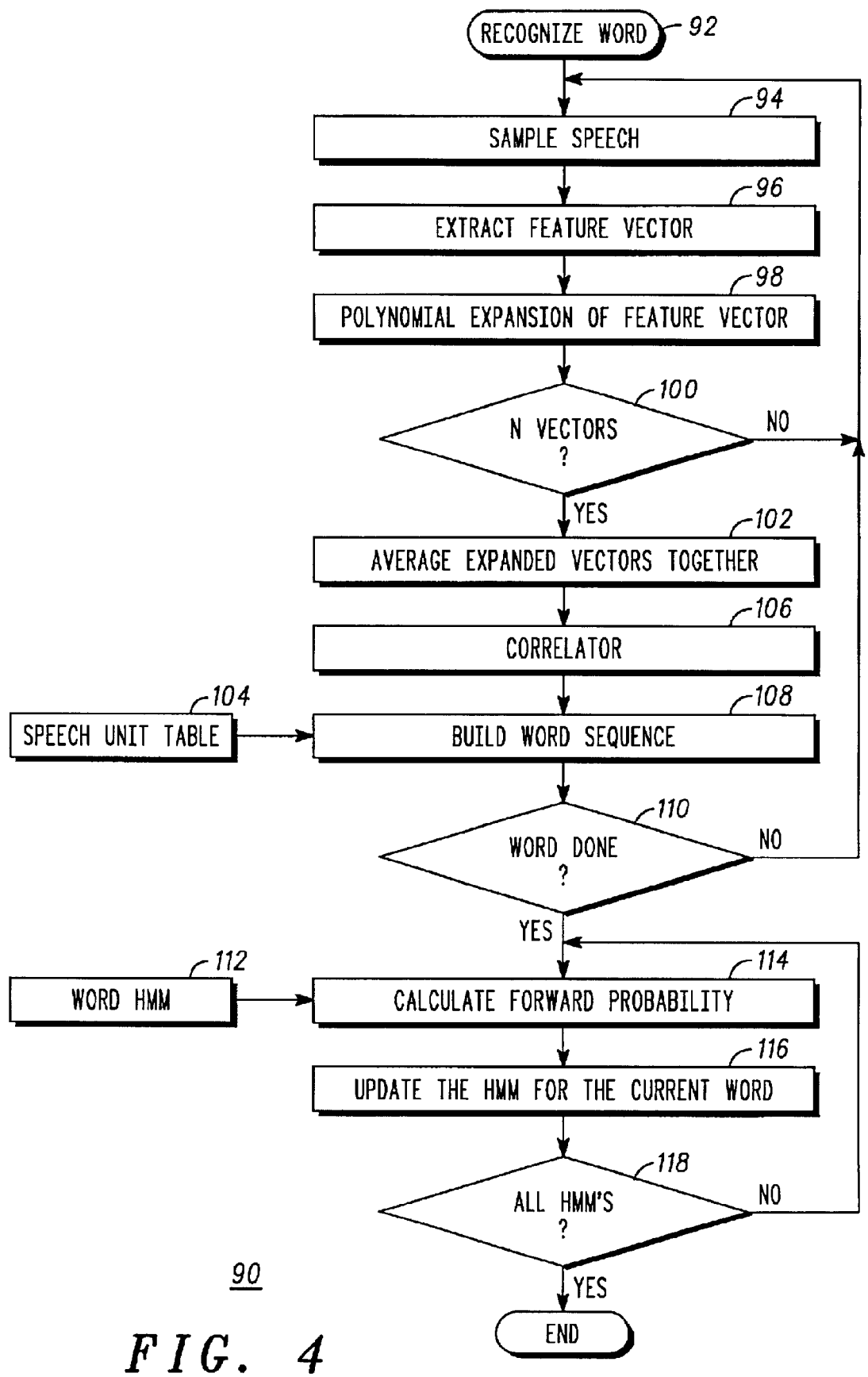
FIG. 4 is a flowchart for identifying a spoken word at an input of the speech recognition system shown in FIG. 1.

FIG. 4 is a flowchart 90 of the process that performs the actual speech recognition. The third section of the recognition system extracts the feature vectors from the input speech and then expands these feature vectors into high order polynomials as shown in process steps 92, 94, 96 and 98. In particular, process step 96 or Extract Feature Vector is the step in which a predefined set of speech parameters are extracted from the sampled speech every frame. The speech parameters or features that are extracted are typically either cepstral and/or delta cepstral coefficients, LPC coefficients, energy, etc. The feature vectors are then expanded into a $2^{nd}$ order polynomial in process step 98. N frames of $2^{nd}$ order vectors are generated by repeating process steps 92–100 until the current word has been completely processed, where N represents the size of the desired speech building block. The N frames are averaged together as shown in process step 102 to form the speech segment vector.

Next, each vector in the current word is correlated in process step 106 with every speech segment vector stored in the speech unit table 104 and a best match is determined for each input speech block. The result of the correlation is found in process step 108 and represents a sequence of speech units that make up the current spoken word. This sequence is used during the training process of the HMM models in HMM table 24 (see FIG. 1) as well as the recognition process. The whole process is repeated until the entire word is done, as shown in process step 110.

During the training process for the speech recognizer, the speech unit sequence that makes up the current word is retrieved from Word HMM 112 and used to train the Hidden Markov Model (HMM) for that word. The Viterbi algorithm is used in process step 114 to determine the most probable state sequence for the model given the speech unit sequence for the current word and given the word model to be trained. The Viterbi algorithm performs a maximum likelihood computation by calculating a measure of similarity, or distance, for all possible paths or sequences. Then, in process step 116 the state sequence is used to update the state transition matrix and the observation probability density distribution matrix for the current HMM word model. The most probable state sequence is then recalculated based on the updated model, and then the model is updated again using the results of the recalculated state sequence. This update cycle is repeated using process steps 114, 116 and 118 until the model converges. Once the model has converged for the current speaker the next speaker is processed and the HMM word model is updated again. The same HMM word model is repetitively updated for every speaker of the same vocabulary word as shown in process step 118.

HMM table 24 (FIG. 1) consists of three matrices for each word in the vocabulary, i.e., an Initial State, a State Transition, and an Observation Probability Density Distribution. The Initial State matrix is a list of probabilities for starting in each of the possible states. The State Transition matrix lists the probabilities of transitioning from any given state to all possible states. The Observation Probability Density Distribution matrix lists the probabilities of any given speech unit being observed from any given state.

The third section of the speech recognizer system performs the actual speech recognition based on the speech units and the HMM word models. The recognizer's feature vector extraction and word sequence building is identical to the feature vector extraction and word sequence building of the training process. For the given word sequence, the forward probability is calculated for each HMM word model in the vocabulary. The forward probability calculation uses the word sequence, the state transition matrix and the observation probability density distribution matrix to calculate the probabilities. The HMM word model that produces the highest probability is determined to be the word that was spoken.

By now it should be appreciated that a speech recognition system has been described that provides a new technique to make speech recognition more accurate. The method for developing a set of speech building blocks in a training mode uses polynomial expansion of feature vectors. In addition, feature vectors have been extracted from a speech input using polynomial expansion and then correlated with every speech segment vector stored in the speech unit table.

What is claimed is:

1. A speech recognition system, comprising:

a first section having an input for receiving a spoken command and providing a polynomial expansion of a feature vector generated for the spoken command in a non-training mode;

a second section that provides a polynomial expansion of a feature vector generated in a training mode; and a third section having a correlator block that correlates the polynomial expansion of the feature vector from the first section with the polynomial expansion of the feature vector from the second section, wherein the third section performs a Hidden Markov Model statistical analysis of a correlated feature vector wherein the third section further includes:

a sequence vector block having an input for receiving a signal from the correlator block;

an HMM table having an output; and a Viterbi block having a first input coupled to the sequence vector block, a second input coupled to the HMM table, and an output that provides a state sequence that maximizes a probability of identifying the spoken command.

2. The speech recognition system of claim 1, wherein the first section further includes:

a sampler block having an input for receiving the spoken command;

a feature extractor having an input coupled to an output of the sampler block; and a polynomial expansion block having an input coupled to the feature extractor and an output that provides the polynomial expansion of the feature vector generated for the spoken command.

3. The speech recognition system of claim 1, wherein the second section further includes:

a feature vector generator;

a polynomial expansion block having an input coupled to the feature vector generator, a vector quantizer block having an input coupled to an output of the polynomial expansion block; and a processing block having an input coupled to an output of the vector quantizer block and an output that provides the polynomial expansion of the feature vector generated in the training mode.

4. A method of identifying a spoken command, the method comprising:

providing a training mode for sampling speech that includes, extracting a First set of feature vectors from the sampled speech, averaging consecutive polynomial expansions prior to generating a polynomial expansion of the first set of feature vectors, generating the polynomial expansion of the first set of feature vectors, and quantizing the polynomial expansion;

providing a non-training mode for a speech input that includes, extracting a second set of feature vectors from the speech input, and generating a polynomial expansion of the second set of feature vectors;

correlating the first higher-order vectors generated in the training mode with the second higher-order vectors generated from the spoken command in the non-training mode; and providing a statistical analysis based on a Hidden Markov Model to identify the spoken command.

* * * * *